(12) United States Patent
Klasen et al.

(10) Patent No.: US 6,764,722 B2
(45) Date of Patent: *Jul. 20, 2004

(54) LIQUID-CRYSTALLINE MEDIUM

(75) Inventors: Melanie Klasen, Heuchelheim (DE);
Clarissa Weller, Morfelden (DE);
Kazuaki Tarumi, Seeheim (DE);
Matthias Bremer, Darmstadt (DE)

(73) Assignee: Merck Patent Gesellschaft MIT, Darmstadt (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/833,743

(22) Filed: Apr. 13, 2001

(65) Prior Publication Data

US 2002/0014613 A1 Feb. 7, 2002

(30) Foreign Application Priority Data

Apr. 14, 2000 (DE) .......................................... 100 18 899

(51) Int. Cl.$^7$ .......................... C09K 19/30; C09K 19/20
(52) U.S. Cl. ............... 428/1.1; 252/299.63; 252/299.66
(58) Field of Search ...................... 428/1.1; 252/299.63, 252/299.66

(56) References Cited

U.S. PATENT DOCUMENTS 6,066,268 A * 5/2000 Ichinose et al. ....... 252/299.63
6,217,953 B1 * 4/2001 Heckmeier et al. .......... 428/1.1
6,395,353 B2 * 5/2002 Yanai et al. ................. 428/1.1

* cited by examiner

Primary Examiner—Shean C. Wu
(74) Attorney, Agent, or Firm—Millen, White, Zelano & Branigan, P.C.

(57) ABSTRACT

The invention relates to a liquid-crystalline medium based on a mixture of polar compounds of negative dielectric anisotropy which comprises at least one compound of the formula I1 and at least one compound of the formula I2

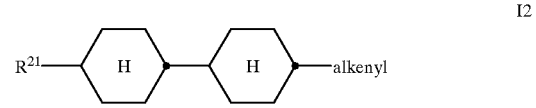

in which
$R^{11}$, $R^{12}$, $R^{21}$ and Z are as defined in claim 1,
and the use thereof for an active matrix display based on the ECB or IPS effect.

17 Claims, No Drawings

LIQUID-CRYSTALLINE MEDIUM

The invention relates to a liquid-crystalline medium based on a mixture of polar compounds having negative dielectric anisotropy, which comprises at least one compound of the formula I1

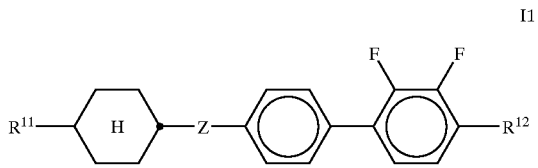

and at least one compound of the formula I2

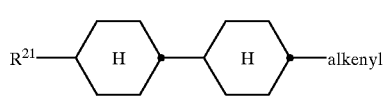

in which $R^{11}$, $R^{12}$ and $R^{21}$ are each, independently of one another, an alkyl or alkenyl radical having up to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

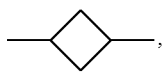

—C≡C—, —CO—, —CO—O—, —O—CO— or —O—CO—O— in such a way that O atoms are not linked directly to one another, Z is —$C_2H_4$—, —CH=CH—, —$CF_2O$—, —$OCF_2$— or a single bond, and alkenyl is a straight-chain alkenyl radical having 2–6 carbon atoms.

Such media are particularly suitable for electro-optical displays with active matrix addressing based on the ECB effect, and for IPS (in-plane switching) displays.

The principle of electrically controlled birefringence, the ECB effect or alternatively DAP effect (deformation of aligned phases), was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy Δn and values for the dielectric anisotropy Δε of from −0.5 to −5 in order to be suitable for high-information display elements based on the ECB effect. Electro-optical display elements based on the ECB effect have a homeotropic edge alignment. Dielectrically negative liquid-crystal media can also be used in displays utilizing the so-called IPS effect.

Technical use of this effect in electro-optical display elements requires LC phases which must satisfy a multiplicity of requirements. Particularly important here are chemical resistance to moisture, air and physical effects, such as heat, radiation in the infrared, visible and ultraviolet regions and direct and alternating electric fields.

Technically suitable LC phases are furthermore required to have a liquid-crystalline mesophase in a suitable temperature range and low viscosity.

None of the series of compounds having a liquid-crystalline mesophase which have been disclosed hitherto includes a single compound which meets all these requirements, In general, therefore, mixtures of from 2 to 25, preferably from 3 to 18, compounds are prepared in order to obtain substances which can be used as LC phases. However, optimum phases could not be prepared easily in this way, since no liquid-crystalline materials of significantly negative dielectric anisotropy were hitherto available.

Matrix liquid-crystal displays are known. Non-linear elements which can be used for individual switching of the individual pixels are, for example, active elements (i.e. transistors). This is then referred to as an "active matrix", and a distinction can be made between two types:

1. MOS (metal oxide semiconductor) transistors on a silicon wafer as substrate.
2. Thin-film transistors (TFTs) on a glass plate as substrate.

In the case of type 1, the electro-optical effect used is usually dynamic scattering or the guest-host effect. The use of single-crystal silicon as the substrate material limits the display size, since even modular assembly of various part-displays results in problems at the joints.

In the case of more promising type 2, which is prefer-red, the electro-optical effect used is usually the TN effect.

A distinction is made between two technologies: TFTs comprising compound semiconductors, for example CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully colour-compatible displays, in which a mosaic of red, green and blue filters is arranged in such a way that each filter element is located opposite a switchable pixel.

The TFT displays usually operate as TN cells with crossed polarizers in transmission and are backlit.

The term MLC displays here covers any matrix display containing integrated non-linear elements, i.e., besides the active matrix, also displays containing passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Euro-display 84, Sept. 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display drops. Since the resistivity of the liquid-crystal mixture generally drops over the life of an MLC display owing to interaction with the interior surfaces of the display, a high (initial) resistance is very important for displays which must have acceptable resistance values over a long service life.

The disadvantage of the MLC-TN displays disclosed hitherto is due to their comparatively low contrast, relatively high viewing-angle dependence and the difficulty of generating grey shades in these displays.

EP 0 474 062 discloses MLC displays based on the ECB effect. However, the LC mixtures described therein, which are based on 2,3-difluorophenyl derivatives containing an ester, ether or ethyl bridge, have low "voltage holding ratio" (HR) values after UV exposure.

There thus continues to be a great demand for MLC displays which have very high resistivity at the same time as a broad operating temperature range, short response times and a low threshold voltage which can be used to produce various grey shades.

It is an object of the invention to provide MLC displays based on the ECB effect which do not have the abovementioned disadvantages, or only do so to a lesser extent, and at the same time have very high resistivities.

It has now been found that this object can be achieved if nematic liquid-crystal mixtures comprising at least one compound of the formula I1 and one compound of the formula I2 are used in these display elements.

The invention thus relates to a liquid-crystalline medium based on a mixture of polar compounds having negative dielectric anisotropy which comprises at least one compound of the formula I1 and at least one compound of the formula I2.

The mixture according to the invention has very favorable values for the capacitive threshold, relatively high values for the holding ratio and at the same time very good low-temperature stability.

Some preferred embodiments are mentioned below:

a) A medium which additionally comprises one or more compounds of the formula II:

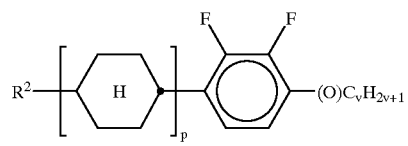

II in which
$R^2$ is independently as defined for $R^{11}$, $R^{12}$ and $R^{21}$,
p is 1 or 2, and
v is from 1 to 6.

b) A medium which additionally comprises one or more compounds of the formula III:

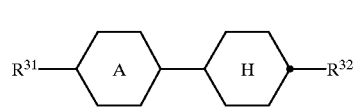

III in which
$R^{31}$ and $R^{32}$ are each, independently of one another, a straight-chain alkyl or alkyloxy radical having up to 12 carbon atoms, and

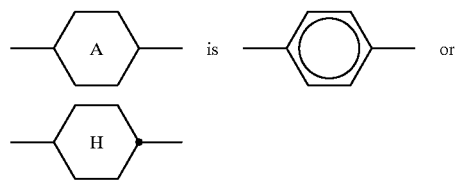

c) A medium which comprises two, three, four or more, preferably two, three or four, compounds of the formula I1.

d) A medium which comprises at least two compounds of the formula I2.

e) A medium in which the proportion of compounds of the formula I1 in the total mixture is at least 10% by weight, preferably at least 20% by weight.

f) A medium in which the proportion of compounds of the formula I2 in the total mixture is at least 5% by weight, preferably at least 10% by weight.

g) A medium in which the proportion of compounds of the formula II in the total mixture is at least 20% by weight.

h) A medium in which the proportion of compounds of the formula III in the total mixture is at least 5% by weight.

i) A medium which comprises at least one compound selected from the formulae I2a and I2b.

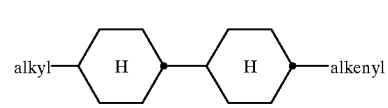

I2a

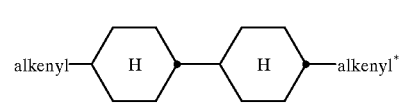

I2b

Particular preference is given to the compounds of the formulae I2aa–I2ad and I2ba–I2be:

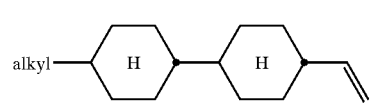

12aa

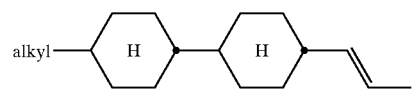

12ab

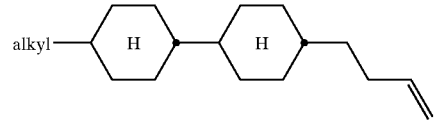

12ac

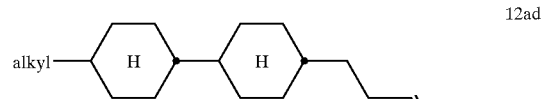

12ad

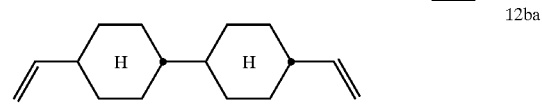

12ba

-continued

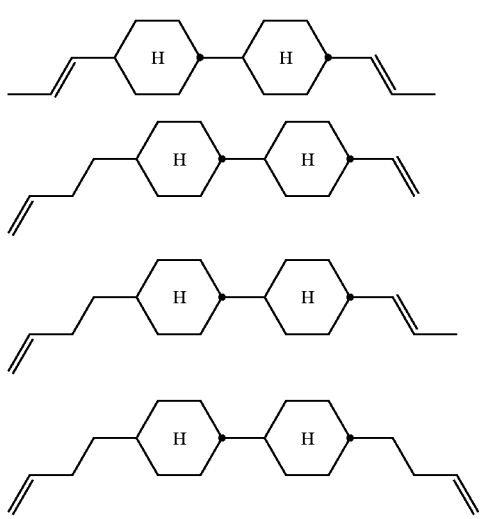

12bb

12bc

12bd

12be in which
alkenyl and
alkenyl* are each, independently of one another, a straight-chain alkenyl radical having 2–6 carbon atoms, and
alkyl is a straight-chain alkyl radical having 1–6 carbon atoms.

j) A medium which additionally comprises a compound selected from the formulae IIIa to IIId:

IIIa

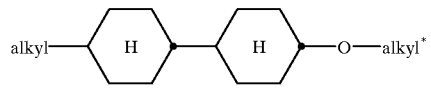

IIIb

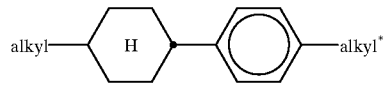

IIIc

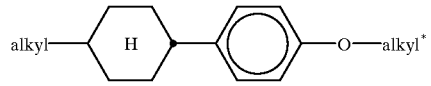

IIId in which
alkyl and
alkyl* are each, independently of one another, a straight-chain alkyl radical having 1–6 carbon atoms.

The medium according to the invention preferably comprises at least one compound of the formula IIIa and/or formula IIIb.

k) A medium which essentially consists of:
10–40% by weight of one or more compounds of the formula I1,
5–30% by weight of one or more compounds of the formula I2,
and
20–70% by weight of one or more compounds of the formula II.

l) A medium which additionally comprises one more compounds of the formulae $R^7$—H—⬡—⬡—H—$C_wH_{2w+1}$ (with F, F substituents)

$R^8$—H—⬡—⬡—⬡—H—$C_xH_{2x+1}$ (with F, F, F, F substituents)

in which
$R^7$ and $R^8$ are each, independently of one another, as defined for $R^{11}$, $R^{12}$ and $R^{21}$ in claim 1, and
w and x are each, independently of one another, from 1 to 6.

m) A medium which additionally comprises one more compounds of the formulae $R^{13}$—H—H—⬡—$(CH_2)_z$—O—$C_mH_{2m+1}$ $R^{14}$—H—⬡—⬡—$(CH_2)_z$—O—$C_mH_{2m+1}$ $R^E$—〜—H—⬡—(O)—alkyl $R^{15}$—H—⬡—O—〜

$R^{16}$—H—⬡—$OCH_2$—〜

$R^{17}$—H—$CF_2O$—⬡—(O)—alkyl $R^{18}$—H—$OCF_2$—⬡—(O)—alkyl $R^{19}$—H—⬡—$CF_2O$—⬡—(O)—alkyl $R^{20}$—H—⬡—$OCF_2$—⬡—(O)—alkyl $R^{21}$—H—H—$CF_2O$—⬡—(O)—alkyl

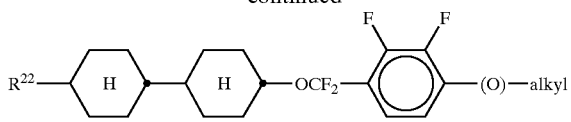

in which $R^{13}$–$R^{22}$ are each, independently of one another, as defined for $R^{11}$, $R^{12}$ and $R^{21}$, and z and m are each, independently of one another, 1–6. $R^E$ is H, $CH_3$, $C_2H_5$ or n-$C_3H_7$.

n) A medium in which the compound of the formula I1 is selected from the group consisting of I1a to I1g:

I1a
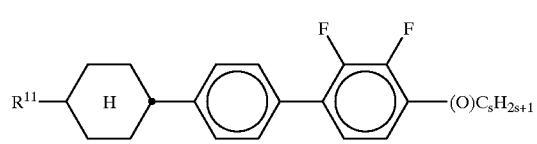

I1b
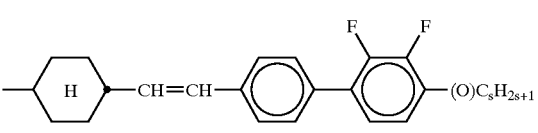

I1c
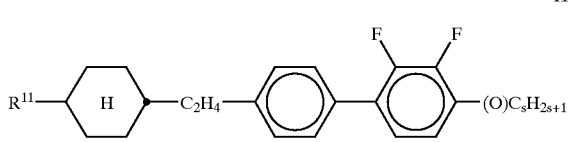

I1d
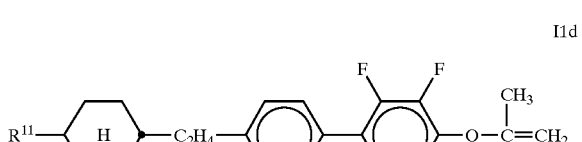

I1e
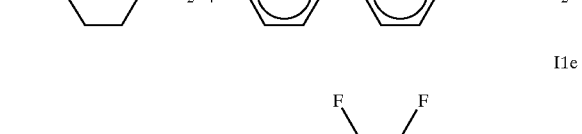

I1f
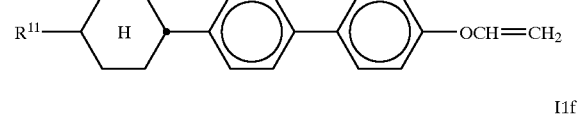

I1g
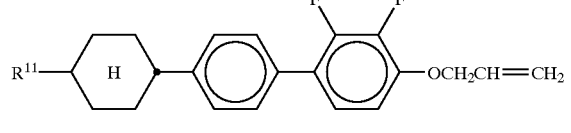

in which $R^{11}$ is as defined above, and s is 1–12. $R^{12}$ is preferably straight-chain alkyl having 1 to 6 carbon atoms, vinyl, 1E-alkenyl or 3E-alkenyl.

o) A medium which comprises one or more compounds of the formula I1a and/or I1g.

p) A medium which additionally comprises one or more compounds of the formula

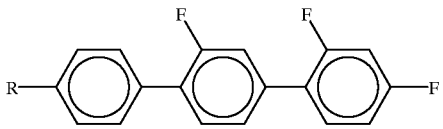

in which R is alkyl, alkenyl, alkoxy or alkenyloxy each having 1 or 2 to 6 carbon atoms.

The invention furthermore relates to an electro-optical display having active matrix addressing based on the ECB effect, characterized in that it comprises, as dielectric, a liquid-crystalline medium as defined above.

The liquid-crystal mixture preferably has a nematic phase range of at least 60 K and a maximum flow viscosity $V_{20}$ of 30 $mm^2 \cdot s^{-1}$ at 20° C.

The liquid-crystal mixture according to the invention preferably has a Δε of from about −0.5 to −6.0, in particular from about −3.0 to −4.5, where Δε is the dielectric anisotropy. The rotational viscosity $\gamma_1$ is preferably <225 mPa·s, in particular <180 mPa·s.

The birefringence Δn in the liquid-crystal mixture is generally between 0.04 and 0.13, preferably between 0.06 and 0.11, and/or the dielectric constant $\epsilon_\parallel$ of greater than or equal to 3, preferably from 3.2 to 8.5.

The dielectrics may also comprise further additives which are known to the person skilled in the art and are described in the literature.

For example, 0–15% of pleochroic dyes can be added, furthermore conductive salts, preferably ethyldimethyl-dodecylammonium 4-hexoxybenzoate, tetrabutylammonium tetraphenylborate or complex salts of crown ethers (cf., for example, Haller et al., Mol. Cryst. Liq. Cryst., Volume 24, pages 249–258 (1973)) for improving the conductivity, or substances for modifying the dielectric anisotropy, the viscosity and/or the alignment of the nematic phases. Such substances are described, for example, in DE-A 22 09 127, 22 40 864, 23 21 632, 23 38 281, 24 50 088, 26 37 430 and 28 53 728.

The individual components of the formulae I1, I2, II and III in the liquid-crystal phases according to the invention are either known or their modes of preparation can easily be derived from the prior art by the person skilled in the relevant art, since they are based on standard methods which are described in the literature.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≦−0.3. It preferably comprises compounds of the formulae I1 and II.

The proportion of component A is preferably between 45 and 100%, in particular between 60 and 100%.

For component A, one (or more) individual compound(s) having a Δε≦−0.8 are preferably selected. The smaller the proportion of component A in the total mixture, the more negative this value must be.

Component B has pronounced nematogeneity and a flow viscosity of not more than 30 $mm^2 \cdot s^{-1}$, preferably not more than 25 $mm^2 \cdot s^{-1}$, at 20° C. It preferably comprises compounds of the formulae I2 and III.

Particularly preferred individual compounds of component B are extremely low-viscosity nematic liquid crystals having a flow viscosity of not more than 18 mm$^{2 \cdot}$s$^{-1}$, preferably not more than 12 mm$^{2 \cdot}$s$^{-1}$, at 20° C.

Component B has monotropic or enantiotropic nematogeneity, has no smectic phases and can prevent the occurrence of smectic phases in liquid-crystal mixtures down to very low temperatures. If, for example, a smectic liquid-crystal mixture is mixed with various materials of high nematogeneity, the degree of suppression of smectic phases that is achieved can be used to compare the nematogeneity of these materials.

Numerous suitable materials are known to the person skilled in the art from the literature. Particular preference is given to compounds of the formula III.

In addition, these liquid-crystal phases can also contain more than 18 components, preferably from 18 to 25 components.

The phases preferably contain from 4 to 15, in particular 5 to 12, compounds of the formulae I1, I2, II and optionally III.

Besides compounds of the formulae I1, I2, II and III, it is also possible for other constituents to be present, for example in an amount of up to 45% of the total mixture, but preferably up to 35%, in particular up to 10%.

The other constituents are preferably selected from nematic or nematogenic substances, in particular known substances, from the classes consisting of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1, 4-bis-cyclohexylbiphenyls or cyclohexylpyrimidines, phenyl- or cyclohexyldioxanes, optionally halogenated stilbenes, benzyl phenyl ethers, tolans and substituted cinnamic acids.

Important compounds which can be used as constituents of liquid-crystal mixtures of this type can be characterized by the formula IV $$R^9\text{—L—G—E—}R^{10} \quad\quad\quad IV$$

in which L and E are each a carbocyclic or heterocyclic ring system from the group consisting of 1,4-disubstituted benzene and cyclohexane rings, 4,4'-disubstituted biphenyl, phenylcyclohexane and cyclo-hexylcyclohexane systems, 2,5-disubstituted pyrimidine and 1,3-dioxane rings, 2,6-disubstituted naphthalene, di- and tetrahydronaphthalene, quinazoline and tetra-hydroquinazoline, G is

| | |
|---|---|
| —CH=CH— | —N(O)=N— |
| —CH—CQ— | —CH=N(O)— |
| —C≡C— | —CH$_2$—CH$_2$— |
| —CO—O— | —CH$_2$—O— |
| —CO—S— | —CH$_2$—S— |
| —CH=N— | —COO—Phe—COO— | or a C—C single bond, Q is halogen, preferably chlorine, or —CN, and $R^9$ and $R^{10}$ are each alkyl, alkenyl, alkoxy, alkanoyloxy or alkoxycarbonyloxy having up to 18, preferably up to 8, carbon atoms, or one of these radicals is alternatively CN, NC, NO$_2$, NCS, CF$_3$, F, Cl or Br.

In most of these compounds, $R^9$ and $R^{10}$ are different from one another, one of these radicals usually being an alkyl or alkoxy group. However, other variants of the proposed substituents are also common. Many such substances or mixtures thereof are commercially available. All these substances can be prepared by methods which are known from the literature.

It will be appreciated by a person skilled in the art that the ECB mixture according to the invention may also comprise compounds in which, for example, H, N, O, Cl or F have been replaced by the corresponding isotopes.

The construction of the liquid-crystal displays according to the invention corresponds to the conventional geometry, as described, for example, in EP-A 0 240 379.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above, and of corresponding German application No. DE 100 18 899.0, filed Apr. 14, 2000, is hereby incorporated by reference.

Besides the compounds of the formulae I1 and I2, the liquid-crystal mixtures according to the invention preferably comprise one or more of the compounds mentioned below.

The following abbreviations are used:

(n, m=1–6; z=1–6)

PCH-nOmFF

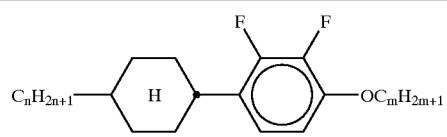

CCP-nOmFF

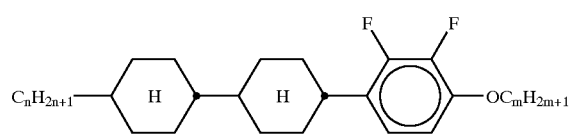

CCP-nmFF

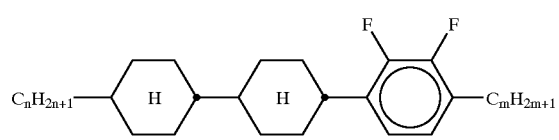

-continued
D-nOmFF
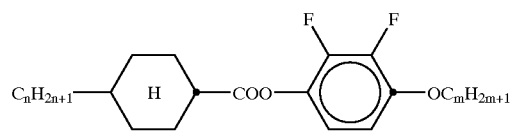
CBC-nmF
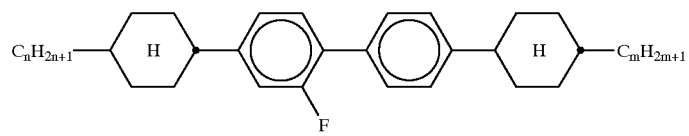
CBC-nm
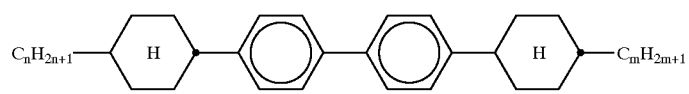
CCP-V-m
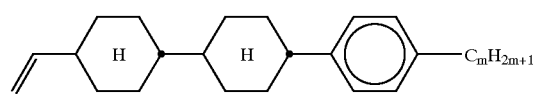
CCP-Vn-m
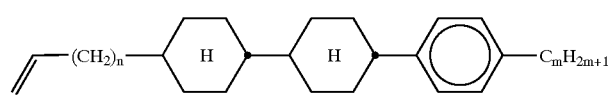
CPYC-n-m
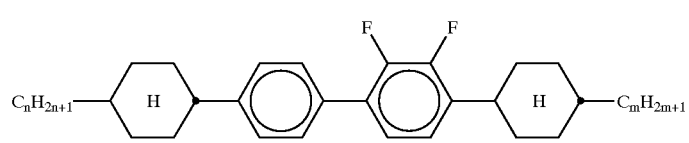
CYYC-n-m
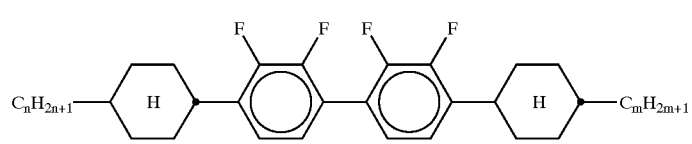
CCYY-n-(O)m
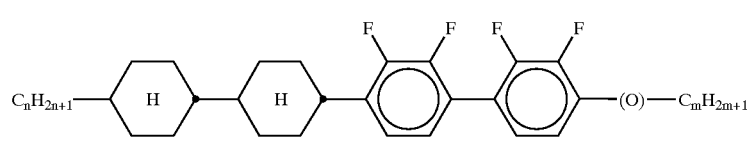
CCH-nOm
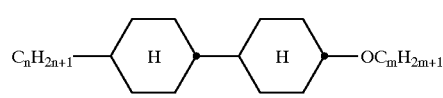
CY-n-m
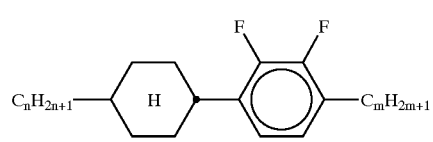
CCH-nm
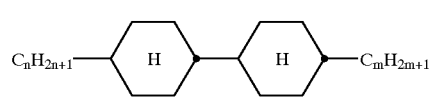
CC-n-V
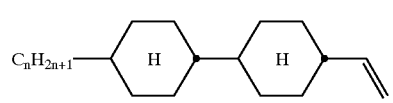
CC-n-V1
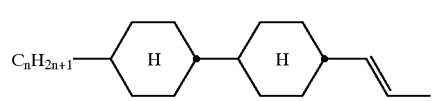

-continued
CP-nOmFF
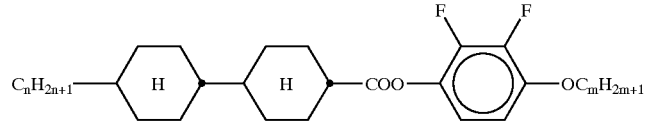
CH-nm
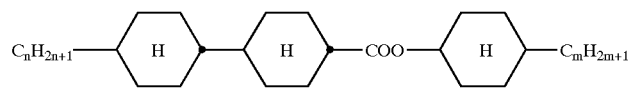
CEY-V-n
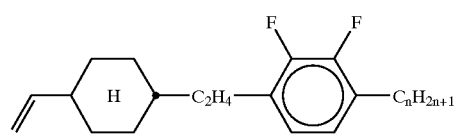
CVY-V-n
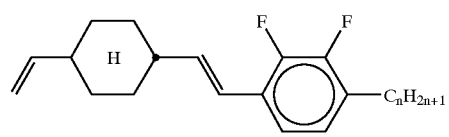
CY-V-On
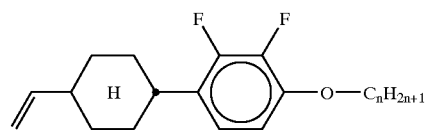
CY-n-O1V
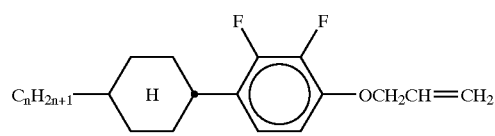
CY-n-OC(CH$_3$)=CH$_2$
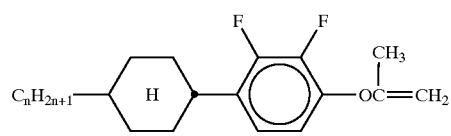
BCN-nm
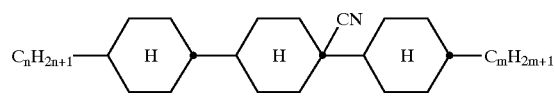
CCN-nm
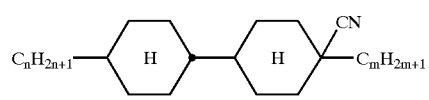
CY-n-OV
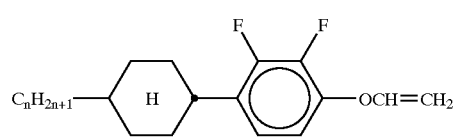
PCH-nm
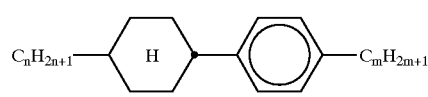
PCH-nOm
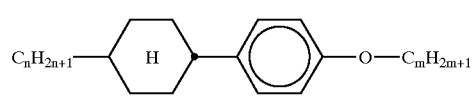

-continued
PGIGI-n-F
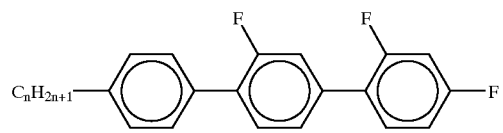
BCH-nm
CCPC-nm
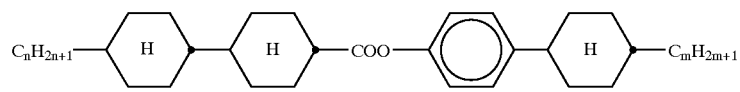
CCY-n-zOm
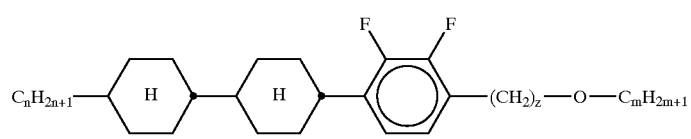
CPY-n-Om
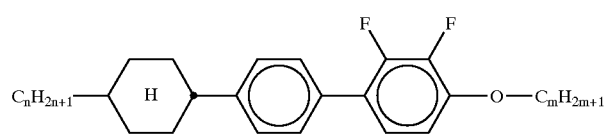
CPY-V-Om
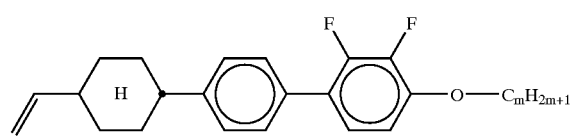
CPY-n-m
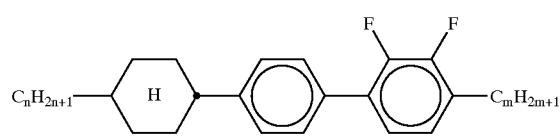
CQY-n-(O)m
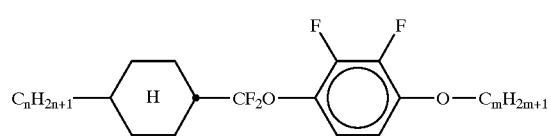
CQIY-n-(O)m
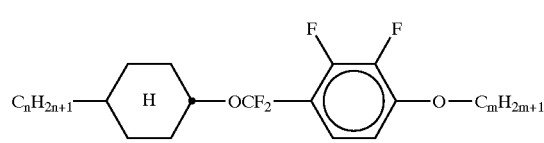
CCQY-n-(O)m
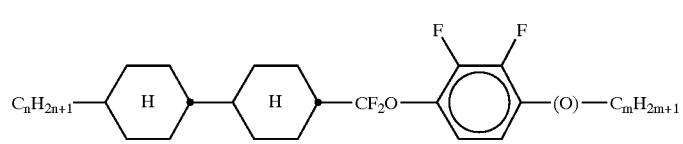
CCQIY-n-(O)m
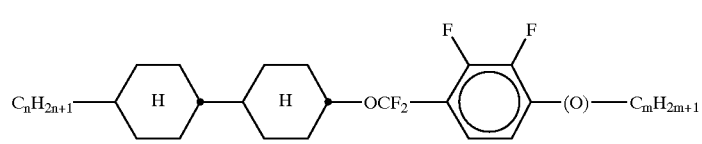

CPQY-n-(O)m

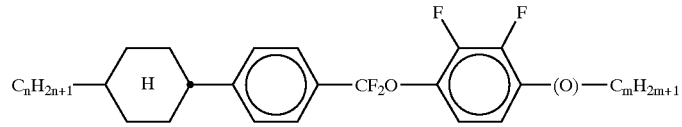

CPQIY-n-(O)m

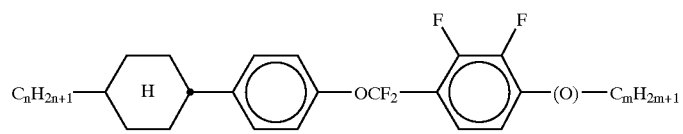

CCY-V-(O)m

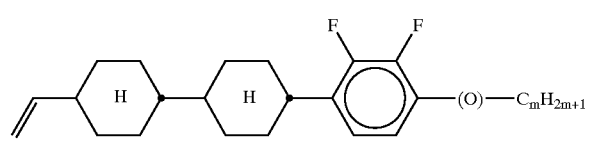

The abbreviations furthermore have the following meanings:

$V_o$ threshold voltage, capacitive [V] at 20° C.
Δn optical anisotropy measured at 20° C. and 589 nm
Δε dielectric anisotropy at 20° C. and 1 kHz
c.p. clearing point [° C.]
$\gamma_1$ rotational viscosity measured at 20° C. [mPa·s]
LTS low temperature stability The display used to measure the threshold voltage has two plane-parallel outer plates at a separation of 5 μm and electrode layers covered by lecithin alignment layers on the inside of the outer plates, which produce a homeotropic alignment of the liquid crystal molecules.

MIXTURE EXAMPLES

Example 1

| | | | | |
|---|---|---|---|---|
| PCH-304FF | 18.0% | S → N: | | <−40° C. |
| PCH-504FF | 19.0% | Clearing point [° C.]: | | 69.5 |
| BCH-32 | 8.0% | Δn [589 nm, 20° C.]: | | +0.1011 |
| CCP-V-1 | 7.0% | Δε [1 kHz, 20° C.]: | | −3.3 |
| CC-3-V1 | 8.0% | $\epsilon_\parallel$ [1 kHz, 20° C.]: | | 3.6 |
| CC-5-V | 18.0% | $\gamma_1$ [mPa · s, 20° C.]: | | 115 |
| CPY-2-02 | 12.0% | $V_o$ [V]: | | 2.10 |
| CPY-3-02 | 10.0% | LTS in cells: | | nem. > 1000 h |
| | | At −20° C., −30° C., −40° C. | | |

Example 2

| | | | | |
|---|---|---|---|---|
| PCH-304FF | 19.0% | S → N: | | <−40° C. |
| PCH-504FF | 20.0% | Clearing point [° C.]: | | 71.0 |
| CCP-302FF | 6.0% | Δn [589 nm, 20° C.]: | | +0.1020 |
| BCH-32 | 7.0% | Δε [1 kHz, 20° C.]: | | −3.9 |
| CCH-35 | 5.0% | $\epsilon_\parallel$ [1 kHz, 20° C.]: | | 3.7 |
| CC-3-V1 | 8.0% | $\gamma_1$ [mPa · s, 20° C.]: | | 142 |
| CC-5-V | 11.0% | $V_o$ [V]: | | 1.92 |
| CPY-2-02 | 12.0% | LTS in cells: | | nem. > 1000 h |
| CPY-3-02 | 12.0% | At −20° C., and −30° C. | | |

Example 3

| | | | | |
|---|---|---|---|---|
| PCH-304FF | 10.0% | S → N: | | <−30° C. |
| PCH-502FF | 8.0% | Clearing point [° C.]: | | 75.5 |
| PCH-504FF | 18.0% | Δn [589 nm, 20° C.]: | | +0.1005 |
| CCP-302FF | 10.0% | Δε [1 kHz, 20° C.]: | | −4.2 |
| CC-3-V1 | 8.0% | $\epsilon_\parallel$ [1 kHz, 20° C.]: | | 3.7 |
| CC-5-V | 13.0% | $\gamma_1$ [mPa · s, 20° C.]: | | 149 |
| CCH-35 | 5.0% | $V_o$ [V]: | | 1.95 |
| CPY-2-02 | 12.0% | | | |
| CPY-3-02 | 12.0% | | | |
| BCH-32 | 4.0% | | | |

Example 4

| | | | | |
|---|---|---|---|---|
| PCH-304FF | 8.0% | S → N: | | <−30° C. |
| PCH-502FF | 8.0% | Clearing point [° C.]: | | 83.5 |
| PCH-504FF | 18.0% | Δn [589 nm, 20° C.]: | | +0.1022 |
| CCP-302FF | 14.0% | Δε [1 kHz, 20° C.]: | | −4.9 |
| CCP-31FF | 7.0% | $\epsilon_\parallel$ [1 kHz, 20° C.]: | | 3.8 |
| CC-5-V | 8.0% | $\gamma_1$ [mPa · s, 20° C.]: | | 189 |
| CC-3-V1 | 8.0% | $V_o$ [V]: | | 1.93 |
| CCH-35 | 5.0% | | | |
| CPY-2-02 | 12.0% | | | |
| CPY-3-02 | 12.0% | | | |

Example 5

| | | | | |
|---|---|---|---|---|
| PCH-304FF | 11.0% | S → N: | | <−30° C. |
| PCH-504FF | 16.0% | Clearing point [° C.]: | | 83.5 |
| CC-5-V | 12.0% | Δn [589 nm, 20° C.]: | | +0.1006 |
| PCH-302 | 6.0% | Δε [1 kHz, 20° C.]: | | −3.7 |
| CCH-35 | 5.0% | $\epsilon_\parallel$ [1 kHz, 20° C.]: | | 3.5 |
| CC-3-V1 | 8.0% | $\gamma_1$ [mPa · s, 20° C.]: | | 150 |
| CPY-2-02 | 12.0% | $V_o$ [V]: | | 2.23 |
| CPY-3-02 | 12.0% | | | |
| CCP-302FF | 11.0% | | | |
| CCP-V2-1 | 7.0% | | | |

Example 6

| | | | |
|---|---|---|---|
| PCH-502FF | 8.0% | S → N: | <-30° C. |
| PCH-504FF | 16.0% | Clearing point [° C.]: | 70.5 |
| PCH-301 | 9.0% | Δn [589 nm, 20° C.]: | +0.1007 |
| CCP-V2-1 | 5.0% | Δε [1 kHz, 20° C.]: | -4.2 |
| CC-3-V1 | 9.0% | $\epsilon_\parallel$ [1 kHz, 20° C.]: | 3.9 |
| CCH-35 | 5.0% | $\gamma_1$ [mPa · s, 20° C.]: | 139 |
| CC-5-V | 6.0% | $V_o$ [V]: | 1.96 |
| D-302-FF | 8.0% | | |
| D-502FF | 8.0% | | |
| CPY-2-02 | 14.0% | | |
| CPY-3-02 | 12.0% | | |

Example 7

| | | | |
|---|---|---|---|
| PCH-304FF | 14.0% | S → N: | <-30° C. |
| PCH-502FF | 7.0% | Clearing point [° C.]: | 80.5 |
| PCH-504FF | 18.0% | Δn [589 nm, 20° C.]: | +0.1006 |
| CC-5-V | 8.0% | Δε [1 kHz, 20° C.]: | -4.9 |
| CC-3-V1 | 8.0% | $\epsilon_\parallel$ [1 kHz, 20° C.]: | 3.8 |
| CCH-35 | 5.0% | $\gamma_1$ [mPa · s, 20° C.]: | 186 |
| CPY-2-02 | 12.0% | $V_o$ [V]: | 1.89 |
| CPY-3-02 | 12.0% | | |
| CCP-302FF | 13.0% | | |
| CCPC-33 | 3.0% | | |

Example 8

| | | | |
|---|---|---|---|
| PCH-304FF | 14.0% | S → N: | <-30° C. |
| PCH-502FF | 10.0% | Clearing point [° C.]: | 80.0 |
| PCH-504FF | 17.0% | Δn [589 nm, 20° C.]: | +0.1104 |
| CCH-35 | 5.0% | Δε [1 kHz, 20° C.]: | -5.1 |
| CC-3-V1 | 9.0% | $\epsilon_\parallel$ [1 kHz, 20° C.]: | 3.8 |
| BCH-32 | 6.0% | $\gamma_1$ [mPa · s, 20° C.]: | 202 |
| CPY-2-02 | 13.0% | $V_o$ [V]: | 1.83 |
| CPY-3-02 | 12.0% | | |
| CCP-302FF | 14.0% | | |

Example 9

| | | | |
|---|---|---|---|
| PCH-304FF | 14.0% | S → N: | <-30° C. |
| PCH-502FF | 8.0% | Clearing point [° C.]: | 70.0 |
| PCH-504FF | 15.0% | Δn [589 nm, 20° C.]: | +0.0906 |
| CCP-302FF | 8.0% | Δε [1 kHz, 20° C.]: | -3.7 |
| CPY-2-02 | 9.0% | $\epsilon_\parallel$ [1 kHz, 20° C.]: | 3.6 |
| CPY-3-02 | 10.0% | $\gamma_1$ [mPa · s, 20° C.]: | 119 |
| CCP-V2-1 | 5.0% | $V_o$ [V]: | 2.03 |
| CC-3-V1 | 8.0% | | |
| CCH-35 | 5.0% | | |
| CC-5-V | 18.0% | | |

Example 10

| | | | |
|---|---|---|---|
| PCH-304FF | 18.0% | S → N: | <-30° C. |
| PCH-502FF | 10.0% | Clearing point [° C.]: | 80.5 |
| PCH-504FF | 15.0% | Δn [589 nm, 20° C.]: | +0.1192 |
| CCP-302FF | 10.0% | Δε [1 kHz, 20° C.]: | -5.1 |
| BCH-32 | 8.0% | $\epsilon_\parallel$ [1 kHz, 20° C.]: | 4.0 |
| CCP-V-1 | 10.0% | $\gamma_1$ [mPa · s, 20° C.]: | 225 |
| PCH-302 | 3.0% | $V_o$ [V]: | 1.83 |
| PGIGI-3-F | 2.0% | | |
| CPY-2-02 | 12.0% | | |
| CPY-3-02 | 12.0% | | |

Example 11

| | | | |
|---|---|---|---|
| PCH-304FF | 15.0% | S → N: | < -30° C. |
| PCH-504FF | 15.0% | Clearing point [° C.]: | 79.0 |
| CCH-35 | 5.0% | Δn [589 nm, 20° C.]: | +0.1122 |
| CC-5-V | 12.0% | Δε [1 kHz, 20° C.]: | -3.7 |
| CC-3-V1 | 10.0% | $\epsilon_\parallel$ [1 kHz, 20° C.]: | 3.6 |
| BCH-32 | 8.0% | $V_o$ [V]: | 2.04 |
| CPY-2-02 | 10.0% | $\gamma_1$ [mPa · s, 20° C.]: | 145 |
| CPY-3-02 | 7.0% | | |
| CPY-V-02 | 10.0% | | |
| CPY-V-04 | 8.0% | | |

Example 12

| | | | |
|---|---|---|---|
| PCH-304FF | 10.0% | S → N: | < -30° C. |
| PCH-504FF | 16.0% | Clearing point [° C.]: | 80.0 |
| CCH-35 | 5.0% | Δn [589 nm, 20° C.]: | +0.1021 |
| CC-5-V | 20.0% | Δε [1 kHz, 20° C.]: | -3.5 |
| CC-3-V1 | 10.0% | $\epsilon_\parallel$ [1 kHz, 20° C.]: | 3.5 |
| BCH-32 | 3.0% | $V_o$ [V]: | 2.17 |
| CPY-2-02 | 10.0% | $\gamma_1$ [mPa · s, 20° C.]: | 131 |
| CPY-3-02 | 10.0% | LTS in cells: | nem. > 1000 h |
| CPY-V-02 | 10.0% | at -20° C., -30° C. | |
| CCP-302FF | 6.0% | | |

Example 13

| | | | |
|---|---|---|---|
| PCH-304FF | 14.0% | S → N: | < -30° C. |
| PCH-504FF | 15.0% | Clearing point [° C.]: | 84.0 |
| CCY-V-02 | 10.0% | Δn [589 nm, 20° C.]: | +0.1140 |
| CPY-3-1 | 9.0% | Δε [1 kHz, 20° C.]: | -4.8 |
| CC-3-V1 | 10.0% | $\epsilon_\parallel$ [1 kHz, 20° C.]: | 3.8 |
| CCH-35 | 5.0% | $V_o$ [V]: | 1.94 |
| CC-5-V | 7.0% | $\gamma_1$ [mPa · s, 20° C.]: | 183 |
| CPY-V-02 | 10.0% | LTS in cells: | nem. > 1000 h |
| CPY-2-02 | 10.0% | at -20° C. | |
| CPY-3-02 | 10.0% | | |

Example 14

| | | | |
|---|---|---|---|
| PCH-304FF | 20.0% | S → N: | < -40° C. |
| PCH-504FF | 16.0% | Clearing point [° C.]: | 69.0 |
| BCH-32 | 8.0% | Δn [589 nm, 20° C.]: | +0.0978 |
| CCP-V-1 | 8.0% | Δε [1 kHz, 20° C.]: | -3.0 |
| CC-3-V1 | 8.0% | $\epsilon_\parallel$ [1 kHz, 20° C.]: | 3.6 |
| CC-5-V | 20.0% | $V_o$ [V]: | 2.17 |
| CPY-2-02 | 10.0% | $\gamma_1$ [mPa · s, 20° C.]: | 108 |
| CPY-3-02 | 10.0% | LTS in cells: | nem. > 1000 h |
| | | at -20° C., -30° C., -40° C. | |

Example 15

| | | | |
|---|---|---|---|
| PCH-304FF | 16.0% | S → N: | < -30° C. |
| PCH-504FF | 18.0% | Clearing point [° C.]: | 73.5 |
| CCP-302FF | 6.0% | Δn [589 nm, 20° C.]: | +0.0883 |
| CPY-2-02 | 6.0% | Δε [1 kHz, 20° C.]: | -3.1 |
| CPY-3-02 | 11.0% | $\epsilon_\parallel$ [1 kHz, 20° C.]: | 3.4 |
| CCP-V2-1 | 10.0% | $V_o$ [V]: | 2.26 |
| CC-3-V1 | 8.0% | $\gamma_1$ [mPa · s, 20° C.]: | 113 |
| CCH-35 | 5.0% | LTS in cells: | nem. > 1000 h |
| CC-5-V | 20.0% | at -20° C. and -30° C. | |

Example 16

| | | | |
|---|---|---|---|
| PCH-304FF | 13.0% | Clearing point [° C.]: | 70 |
| PCH-502FF | 8.0% | Δn [589 nm, 20° C.]: | +0.0986 |
| PCH-504FF | 11.0% | Δε [1 kHz, 20° C.]: | −3.2 |
| CPY-3-02 | 10.0% | ε∥ [1 kHz, 20° C.]: | 3.6 |
| CPQIY-3-02 | 5.0% | V₀ [V]: | 2.12 |
| CPQIY-3-04 | 5.0% | γ₁ [mPa · s, 20° C.]: | 116 |
| CPY-2-02 | 9.0% | | |
| BCH-32 | 8.0% | | |
| CC-3-V1 | 8.0% | | |
| CCH-35 | 5.0% | | |
| CC-5-V | 18.0% | | |

Example 17

| | | | |
|---|---|---|---|
| PCH-304FF | 16.0% | Clearing point [° C.]: | 70.5 |
| PCH-502FF | 8.0% | Δn [589 nm, 20° C.]: | +0.0954 |
| PCH-504FF | 12.0% | Δε [1 kHz, 20° C.]: | −3.4 |
| CPY-3-02 | 8.0% | ε∥ [1 kHz, 20° C.]: | 3.6 |
| CPQY-3-02 | 5.0% | V₀ [V]: | 2.08 |
| CPQY-5-02 | 5.0% | γ₁ [mPa · s, 20° C.]: | 122 |
| CPY-2-02 | 9.0% | | |
| BCH-32 | 8.0% | | |
| CC-3-V1 | 8.0% | | |
| CCH-35 | 5.0% | | |
| CC-5-V | 16.0% | | |

Example 18

| | | | |
|---|---|---|---|
| PCH-304FF | 8.0% | Clearing point [° C.]: | 70.0 |
| PCH-502FF | 10.0% | Δn [589 nm, 20° C.]: | +0.1023 |
| PCH-504FF | 14.0% | Δε [1 kHz, 20° C.]: | −3.3 |
| CPY-3-02 | 12.0% | ε∥ [1 kHz, 20° C.]: | 3.6 |
| CQY-5-1 | 5.0% | V₀ [V]: | 2.14 |
| CQY-3-04 | 5.0% | γ₁ [mPa · s, 20° C.]: | 104 |
| CPY-3-04 | 12.0% | | |
| BCH-32 | 9.0% | | |
| CC-3-V1 | 10.0% | | |
| CCH-35 | 5.0% | | |
| CC-5-V | 10.0% | | |

Example 19

| | | | |
|---|---|---|---|
| PCH-304FF | 11.0% | Clearing point [° C.]: | 69.5 |
| PCH-502FF | 9.0% | Δn [589 nm, 20° C.]: | +0.0952 |
| PCH-504FF | 16.0% | Δε [1 kHz, 20° C.] | −3.6 |
| CPQIY-3-02 | 8.0% | ε∥ [1 kHz, 20° C.]: | 3.6 |
| CPY-2-04 | 10.0% | V₀ [V] | 2.08 |
| CPY-3-02 | 11.0% | γ₁ [mPa · s, 20° C.] | 120 |
| CCPC-33 | 3.0% | | |
| CC-3-V1 | 8.0% | | |
| CCH-35 | 5.0% | | |
| CC-5-V | 19.0% | | |

Example 20

| | | | |
|---|---|---|---|
| PCH-304FF | 13.0% | Clearing point [° C.]: | 70.5 |
| PCH-502FF | 8.0% | Δn [589 nm, 20° C.]: | +0.0900 |
| PCH-504FF | 16.0% | Δε [1 kHz, 20° C.]: | −3.7 |
| CCQY-3-02 | 8.0% | ε∥ [1 kHz, 20° C.]: | 3.6 |
| CPY-2-02 | 10.0% | V₀ [V]: | 2.06 |
| CPY-3-02 | 10.0% | γ₁ [mPa.s, 20° C.]: | 119 |
| CCP-V2-1 | 4.0% | | |
| CC-3-V1 | 8.0% | | |
| CCH-35 | 5.0% | | |
| CC-5-V | 18.0% | | |

What is claimed is:

1. A liquid-crystalline medium based on a mixture of polar compounds having negative dielectric anisotropy, comprising at least one compound of formula I1

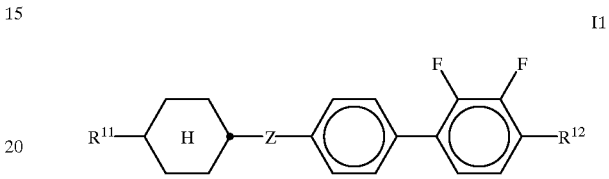

and at least one compound of formula I2

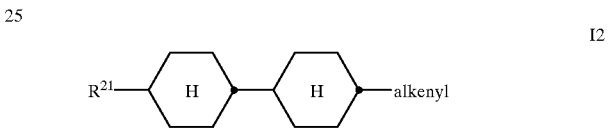

in which $R^{11}$, $R^{12}$ and $R^{21}$ are each, independently of one another, alkyl or alkenyl having up to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

—C≡C—, —CO—, —CO—O—, O—CO— or —O—CO—O— in such a way that O atoms are not linked directly to one another, Z is —$C_2H_4$—, —CH=CH—, or a single bond, and alkenyl is straight-chain alkenyl having 2–6 carbon atoms.

2. The medium according to claim 1, additionally comprising at least one compound of formula II

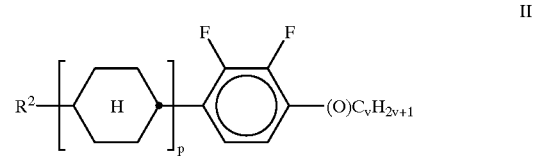

in which $R^2$ is independently as defined for $R^{11}$, $R^{12}$ and $R^{21}$, p is 1 or 2, and v is 1 to 6.

3. The medium according to claim 1, additionally comprising at least one compound of formula III

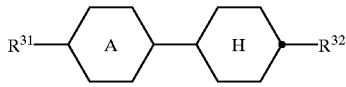

in which

R$^{31}$ and R$^{32}$ are each, independently of one another, a straight-chain alkyl or alkyloxy radical having 1–12 carbon atoms, and

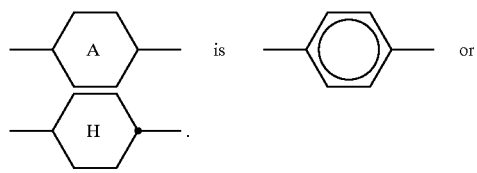

4. The medium according to claim 2, additionally comprising at least one compound of formula III

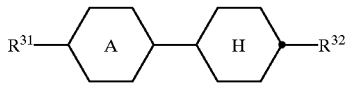

in which R$^{31}$ and R$^{32}$ are each, independently of one another, a straight-chain alkyl or alkyloxy radical having 1–12 carbon atoms, and

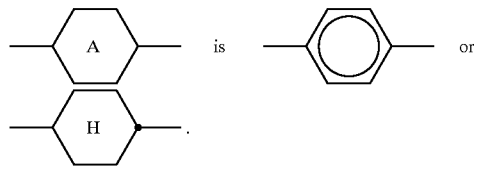

5. The medium according to claim 1, comprising at least three compounds of formulae I1 or I2.

6. The medium according to claim 1, having a proportion of compounds of formula I1 in the total mixture of at least 10% by weight.

7. The medium according to claim 1, having a proportion of compounds of formula I2 in the total mixture of at least 5% by weight.

8. The medium according to claim 2, having a proportion of compounds of formula II in the total mixture of at least 20% by weight.

9. The medium according to claim 3, having a proportion of compounds of formula III in the total mixture of at least 5% by weight.

10. The liquid-crystalline medium according to claim 3, comprising at least one compound of formulae IIIa to IIId:

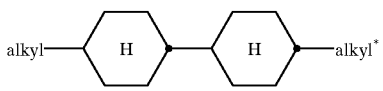

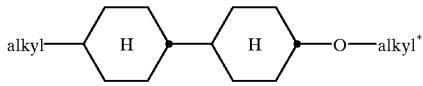

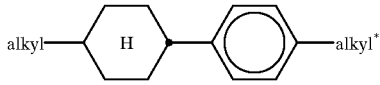

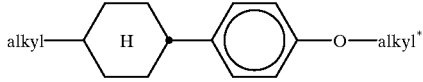

in which alkyl and
alkyl* are each, independently of one another, straight-chain alkyl having 1–6 carbon atoms.

11. The liquid-crystalline medium according to claim 10, comprising at least one compound of formula IIIa, at least one compound of formula IIIb, or a mixture thereof.

12. A liquid-crystaline medium based on a mixture of polar compounds having negative dielectric anisotropy, comprising at least one compound of formula I1

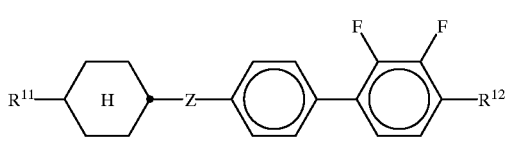

and at least one compound of formula I2

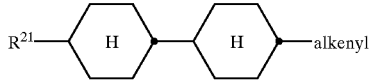

in which

R$^{11}$, R$^{12}$ and R$^{21}$ are each, independently of one another, alkyl or alkenyl having up to 15 carbon atoms which is unsubstituted, monosubstituted by CN or CF$_3$ or at least monosubstituted by halogen, where one or more CH$_2$ groups in these radicals may also, in each case independently of one another, be replaced by —O—, —S—,

—C≡C—, —CO—, —CO—O—, O—CO— or —O—CO—O— in such a way that O atoms are not linked directly to one another, Z is —C$_2$H$_4$—, —CH=CH, or —OCF$_2$— and additionally comprising at least one compound of the formulae

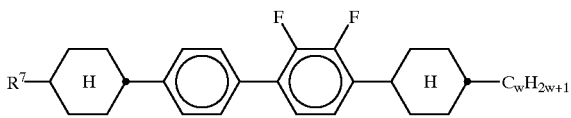

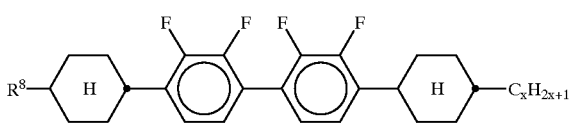

in which

R$^7$ and R$^8$ are each, independently of one another, as defined for R$^{11}$, R$^{12}$ and R$^{21}$, and w and x are each, independently of one another, from 1 to 6.

13. The liquid-crystalline medium according to claim 2, comprising

10–40% by weight of at least one compound of formula I1,

5–30% by weight of at least one compound of formula I2, and

20–70% by weight of at least one compound of formula II.

14. An electro-optical display having active matrix addressing based on ECB effect or IPS effect, comprising as a dielectric, a liquid-crystalline medium according to claim 1.

15. An electro-optical display comprising, as a dielectric, a liquid-crystalline medium according to claim 1.

16. An electro-optical display comprising, as a dielectric, a liquid-crystalline medium according to claim 2.

17. An electro-optical display comprising, as a dielectric, a liquid-crystalline medium according to claim 3.

* * * * *

UNITED STATES PATENT AND TRADEMARK OFFICE
CERTIFICATE OF CORRECTION

PATENT NO. : 6,764,722 B2
DATED : July 20, 2004
INVENTOR(S) : Melanie Klasen et al.

It is certified that error appears in the above-identified patent and that said Letters Patent is hereby corrected as shown below:

Column 24,
Line 27, reads "liquid-crystaline" should read -- liquid-crystalline --

Signed and Sealed this

Eighth Day of February, 2005

JON W. DUDAS
*Director of the United States Patent and Trademark Office*